US012599857B2

(12) United States Patent
Zhong et al.

(10) Patent No.: US 12,599,857 B2
(45) Date of Patent: Apr. 14, 2026

(54) BACTERIAL CELLULOSE-BASED AIR FILTER MESH AND USE THEREOF

(71) Applicants: Hainan Yeguo Foods Co., Ltd, Haikou City (CN); Hainan Guangyu Biotechnology Co., Ltd, Haikou City (CN); Nanjing Yeguo Foods Co., Ltd, Nanjing City (CN); Baoding Guangyu Fruit Processing Food Co., Ltd., Baoding City (CN); Chunyan Zhong, Haikou City (CN); Yuguang Zhong, Haikou City (CN)

(72) Inventors: Yuguang Zhong, Haikou City (CN); Chunyan Zhong, Haikou City (CN)

(73) Assignees: Chunyan Zhong, Haikou City (CN); Yuguang Zhong, Haikou City (CN); HAINAN YEGUO FOODS CO., LTD., Haikou City (CN); HAINAN GUANGYU BIOTECHNOLOGY CO., LTD, Haikou City (CN); NANJING YEGUO FOODS CO., LTD, Nanjing City (CN); BAODING GUANGYU FRUIT PROCESSING FOOD CO., LTD., Baoding City (CN)

( * ) Notice: Subject to any disclaimer, the term of this patent is extended or adjusted under 35 U.S.C. 154(b) by 558 days.

(21) Appl. No.: 17/994,852

(22) Filed: Nov. 28, 2022

(65) Prior Publication Data

US 2023/0094868 A1     Mar. 30, 2023

Related U.S. Application Data

(63) Continuation of application No. PCT/CN2020/093268, filed on May 29, 2020.

(51) Int. Cl.
B01D 39/14 (2006.01)
B01D 39/08 (2006.01)
(Continued)

(52) U.S. Cl.
CPC ........... B01D 39/083 (2013.01); B01D 39/14 (2013.01); B01D 39/16 (2013.01);
(Continued)

(58) Field of Classification Search
CPC ...... B01D 39/00; B01D 39/08; B01D 39/083; B01D 39/10; B01D 39/12; B01D 39/14;
(Continued)

(56) References Cited

U.S. PATENT DOCUMENTS

2018/0237967 A1* 8/2018 Hossain ............... D01D 5/0069

FOREIGN PATENT DOCUMENTS

CN       102225281 A    10/2011
CN       103481600 A     1/2014
(Continued)

OTHER PUBLICATIONS

International Search Report for International Application No. PCT/CN2020/093268, "A bacterial cellulose-based air filter mesh and use thereof", date of mailing: Dec. 29, 2020.
(Continued)

*Primary Examiner* — Allison G Fitzsimmons
(74) *Attorney, Agent, or Firm* — Hamilton, Brook, Smith & Reynolds, P.C.

(57)          ABSTRACT

A bacterial cellulose-based air filter mesh and use thereof are disclosed. The bacterial cellulose-based air filter mesh comprises a three-layer structure, in which a layer of a bacterial cellulose-based filter mesh is sandwiched by two layers of polymer fiber filter meshes; wherein the polymer fiber filter mesh is a mesh having a uniform grid size formed from polymer fibers by blended-yarn weaving; and the bacterial cellulose-based filter mesh is formed by in-situ synthesis of bacterial cellulose on a non-woven fabric through fermentation by bacteria. The bacterial cellulose-based air filter mesh has better particle filtering effect, better formaldehyde (Continued)

adsorption capacity, better antibacterial performance and good electrostatic capacity; and it can be used for producing gauze windows, air conditioning filters, air purification filters and the like, and has a wide range of applications.

15 Claims, 1 Drawing Sheet

(51) Int. Cl.
*B01D 39/16* (2006.01)
*B32B 23/04* (2006.01)

(52) U.S. Cl.
CPC .......... *B01D 39/1623* (2013.01); *B32B 23/04* (2013.01); *B01D 2239/0442* (2013.01)

(58) Field of Classification Search
CPC .... B01D 39/16; B01D 39/1607; B01D 46/00; B01D 46/0001; B01D 46/10; B01D 46/52; B01D 46/528; B01D 46/54; B01D 46/543; B01D 46/546; B01D 46/56; B01D 46/62; B01D 46/64; B01D 46/645; B01D 2239/02; B01D 2239/0208; B01D 2239/025; B01D 2239/0258; B01D 2239/0266; B01D 2239/0275; B01D 2239/04; B01D 2239/0442; B01D 2239/06; B01D 2239/0604; B01D 2239/065; B01D 2239/10; B01D 2275/00; B01D 2275/10; B01D 2275/105; B01D 2275/50; B01D 2323/00; B01D 2323/40
See application file for complete search history.

(56) References Cited

FOREIGN PATENT DOCUMENTS

| CN | 103521010 A | 1/2014 |
| CN | 106512554 A | 3/2017 |
| CN | 107126763 A | 9/2017 |
| JP | 2018140373 A | 9/2018 |

OTHER PUBLICATIONS

National Standard of The People's Republic of China ICS 59.080.01 W 04, Textiles—Evaluation for antibacterial activity—Part 3: Shake flask method Issued on: Apr. 29, 2008, Implemented on Dec. 1, 2008, 9 pages.

* cited by examiner

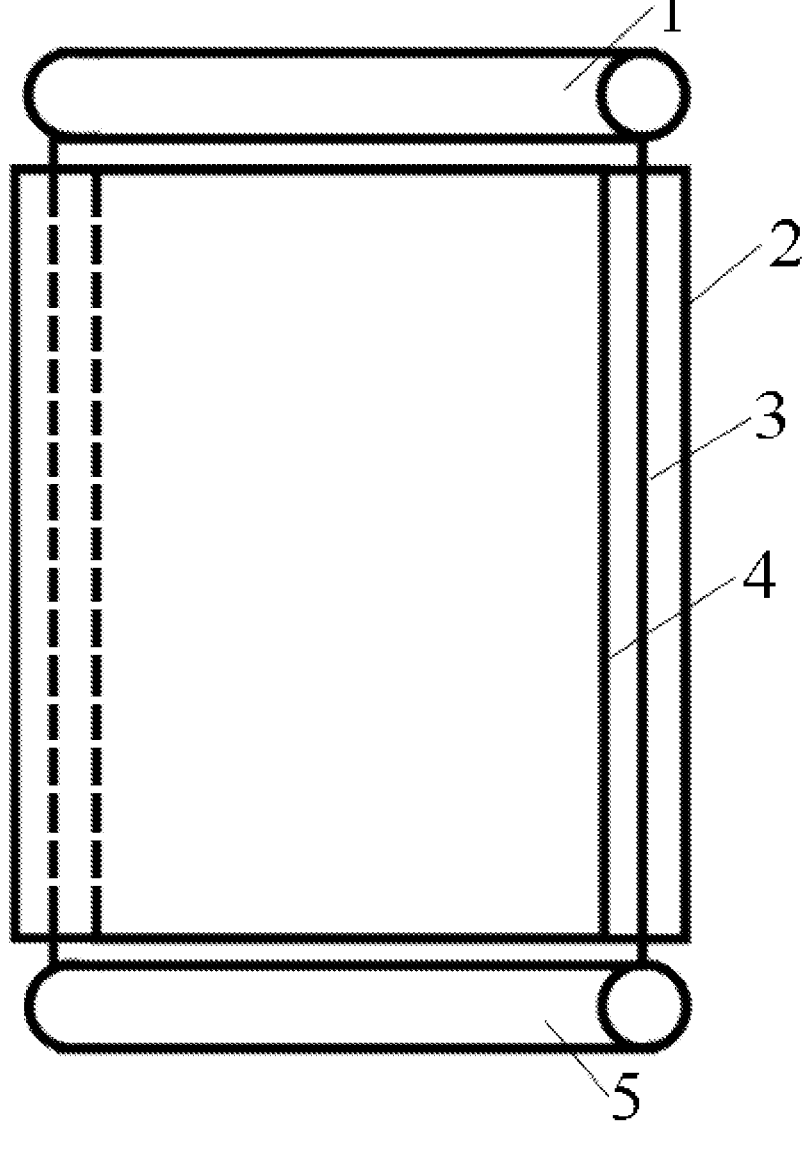

BACTERIAL CELLULOSE-BASED AIR FILTER MESH AND USE THEREOF

CROSS-REFERENCE TO RELATED APPLICATIONS

This application is a continuation application of International Application No. PCT/CN2020/093268, filed May 29, 2020, which is hereby incorporated by reference in its entirety.

FIELD OF TECHNOLOGY

The invention belongs to the technical field of air purification, and particularly relates to a bacterial cellulose-based air filter mesh and use thereof.

BACKGROUND ART

In modern society, haze and formaldehyde become the two major factors that endanger human health.

Recently, Hazy weather occurred more frequently with the gradual deterioration of air quality. The human respiratory tract and lung lobes are invaded if unprotected, causing diseases such as respiratory diseases, cardiovascular diseases, blood diseases, reproductive diseases; and inflammations such as pharyngitis, emphysema, asthma, rhinitis, bronchitis. Long-term exposure to this environment can also induce lung cancer, myocardial ischemia and damage. Hazy weather can easily induce cardiovascular disease. Low air pressure and high humidity in Hazy weather makes it impossible for the human body to sweat, resulting in an increased probability of heart disease. Hazy weather can easily induce respiratory diseases. The haze contains a lot of particulate matter, including heavy metals and other harmful substances, which may enter the respiratory tract and stick to the alveoli, and may cause nasal diseases such as rhinitis in mild cases, and lung sclerosis in severe cases, and may even cause lung cancer. In China, air pollution is mainly measured by PM2.5 (fine particulate matter) concentrations. According to the World Health Organization (WHO) forecast in May 2018, about 7 million deaths worldwide are related to fine particulate matter in the air every year. These substances can cause stroke, heart disease, lung cancer, respiratory infections such as chronic obstructive pulmonary disease and pneumonia.

In the other hand, formaldehyde is the main cause of neonatal malformations, childhood leukemia, memory and intelligence decline in adolescents, and has been identified as a "carcinogenic and teratogenic substance" by the WHO.

It can be seen that formaldehyde and haze are closely related and interrelated, and both cause great harm to the human body. When the hazy weather is severe, the outdoor activities are reduced. However, people need ventilation for indoor activities. The fine particulate matter such as pollen, dust, and exhaust gas cannot be blocked by common gauze window due to its large mesh gap. Once harmful gases such as formaldehyde are absorbed by human body indoors, there may be mild symptoms such as discomfort in the eyes and nose, and severe symptoms such as dizziness, cough, difficulty in breathing, and even death.

There are common air purification methods including filtration, adsorption, low-temperature plasma purification, catalytic purification, and ozone disinfection. Among them, activated carbon fibers, having a unique microporous structure, ultra-high specific surface area and a variety of functional groups, are used in an adsorption method to purify the air. However, some common methods are not suitable for daily household use due to the following disadvantages: poor purification effects on haze and formaldehyde of the common filtration and adsorption methods; high environmental requirements of the low-temperature plasma purification method; the co-presence of chemical reactions in the catalytic purification method; and the harm to human body of the ozone disinfection method, which is widely used in industrial or medical and health places.

SUMMARY OF THE INVENTION

In view of the defects of the prior art, one object of the present invention is to provide a bacterial cellulose-based air filter mesh; and another object of the present invention is to provide use of the bacterial cellulose-based air filter mesh in producing gauze window, air conditioning filter meshes and air purification filter meshes.

The above objects of the present invention are achieved by means of the following technical solutions.

In an aspect, the present invention provides a bacterial cellulose-based air filter mesh, comprising a three-layer structure, in which a layer of a bacterial cellulose-based filter mesh is sandwiched by two layers of polymer fiber filter meshes;

wherein the polymer fiber filter mesh is a mesh having a uniform grid size formed from polymer fibers by blended-yarn weaving; and the bacterial cellulose-based filter mesh is formed by in-situ synthesis of bacterial cellulose on a non-woven fabric through fermentation by bacteria.

In the present invention, the bacterial cellulose is a new nano-ecological fiber-based functional material which is natural, environmentally friendly and excellent in performance. It has a good nanofiber network structure and is the thinnest as known. It has advantages of porous structure, large specific surface area and a large number of pores, and has an adsorption effect for heavy metal ions, $NO_2$, and formaldehyde, etc. The bacterial cellulose-based air filter mesh, composed of the bacterial cellulose-based filter mesh formed by in-situ synthesis of bacterial cellulose on a non-woven fabric through fermentation by bacteria and the polymer fiber filter meshes, is a multi-functional air filter mesh with anti-haze, formaldehyde removing and antibacterial properties, and can be used for gauze windows, air conditioning filters, air purification filters, etc. The bacterial cellulose-based air filter mesh of the present invention is easy to prepare, convenient to operate, and low in cost, and the bacterial cellulose-based filter mesh has good mechanical strength, ease to clean, and multiple properties, such as anti-haze, formaldehyde removing and antibacterial properties.

In the above-mentioned bacterial cellulose-based air filter mesh, preferably, the polymer fiber filter mesh has a thickness of 0.5-5 mm and a grid size of 0.5-5 mm at side length (excluding the thickness of grid lines), and the bacterial cellulose-based filter mesh has a thickness of 1-5 mm.

In the bacterial cellulose-based air filter mesh of the present invention, the length and width of the polymer fiber filter mesh and the bacterial cellulose-based filter mesh are appropriately set according to the specific use. For example, when they are used to make anti-haze gauze windows, they can be set according to the size of the window, and the bacterial cellulose-based air filter mesh can be reasonably fixed on the window frame on the edge of the window.

In the above-mentioned bacterial cellulose-based air filter mesh, preferably, the bacterial cellulose-based air filter mesh further comprises a winding device including two rollers, each of which is located at the respective end of the sandwiched bacterial cellulose-based filter mesh, for winding the bacterial cellulose-based filter mesh, to enable continuous replacement of the bacterial cellulose-based filter mesh sandwiched between the polymer fiber filter meshes.

When the winding device is installed, the exposed parts of both ends of the bacterial cellulose-based filter mesh sandwiched between the polymer fiber filter meshes can be respectively wound on the rollers of the winding device, and a large amount (for example, 10-50 m) of the bacterial cellulose-based filter mesh can be wound on the rollers. After the bacterial cellulose-based air filter mesh is used for a period of time, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

In the above-mentioned bacterial cellulose-based air filter mesh, preferably, the polymer fiber filter mesh is formed from first short fibers, second short fibers and third short fibers in a mass ratio of 1:(1-2):(0.3-1) by blended-yarn weaving;

wherein the first short fibers comprise one or a combination of more of short fibers of polyurethane fibers, nylon fibers, regenerated cellulose fibers, combed cotton fibers, and acetate fibers;

the second short fibers comprise one or a combination of more of short fibers of microporous terylene fibers, polyacrylonitrile fibers, microporous polycarbonate fibers, polyethylene fibers, polypropylene fibers and polytetrafluoroethylene fibers;

the third short fibers comprise polyester short fibers containing nano-titania.

In the above-mentioned bacterial cellulose-based air filter mesh, the materials selected for the first short fibers and the second short fibers have different dielectric constants, which are preferably in a relatively large difference, so that an electrostatic effect may be easily produced in the obtained polymer fiber filter mesh, and the filtration efficiency is improved.

The above-mentioned blended-yarn weaving is a conventional method in the art.

In the above-mentioned bacterial cellulose-based air filter mesh, the short fibers has a length of 35-150 mm.

In the above-mentioned bacterial cellulose-based air filter mesh, preferably, the mass ratio of the first short fibers, the second short fibers and the third short fibers is 1:1:0.5.

In the above-mentioned bacterial cellulose-based air filter mesh, preferably, the nano-titania is included in an amount of 10 wt %-20 wt % in the third short fibers.

In the above-mentioned bacterial cellulose-based air filter mesh, preferably, the nano-titania has a crystal form of rutile type or anatase type.

In the above-mentioned bacterial cellulose-based air filter mesh, preferably, the non-woven fabric is a composite non-woven fabric obtained by spunlace or needle punching a mixture obtained by mixing polypropylene short fibers containing nano-titania, having a length of 35-150 mm, and regenerated cellulose fibers containing activated carbon in a mass ratio of 1:(0.5-2).

In the above-mentioned bacterial cellulose-based air filter mesh, the non-woven fabric as used is a non-woven fabric obtained by mixing and processing polypropylene short fibers containing nano-titania and regenerated cellulose fibers containing activated carbon. It has advantages such as:

(1) The basic material polypropylene and regenerated cellulose fibers are two materials with a larger difference in dielectric constant, so that an electrostatic effect is easily produced to improve the filtration and adsorption efficiency; (2) Titania is a photo-semiconductor material with a photo-catalytic effect as a photocatalyst material, which means that, under the action of ultraviolet light and visible light, titania can produce strong catalytic degradation effect, and can effectively degrade toxic and harmful gases in the air, can effectively kill a variety of bacteria, and can decompose the toxins released by bacteria or fungi for a harmless treatment, while it also has the functions of removing formaldehyde, deodorizing, anti-fouling, purifying the air, etc; (3) As a good adsorption material, activated carbon can effectively adsorb formaldehyde and deodorize. To sum up, the non-woven fabric of the present invention has multiple effects by effectively combining electrostatic adsorption, photocatalysis and physical adsorption.

In the above-mentioned bacterial cellulose-based air filter mesh, each of the three filter mesh layers contains nano-titania. Titania is a photo-semiconductor material with a photocatalytic effect as a photocatalyst material, which means that, under the action of ultraviolet light and visible light, titania can produce strong catalytic degradation effect, and can effectively degrade toxic and harmful gases in the air, can effectively kill a variety of bacteria, and can decompose the toxins released by bacteria or fungi for a harmless treatment, while it also has the functions of removing formaldehyde, deodorizing, anti-fouling, purifying the air, etc.

The above-mentioned process of spunlace or needle punching to obtain the non-woven fabric is a conventional method in the art.

In the above-mentioned bacterial cellulose-based air filter mesh, preferably, the non-woven fabric has a thickness of 0.6-4.5 mm.

In the above-mentioned bacterial cellulose-based air filter mesh, preferably, the nano-titania is included in an amount of 10 wt %-20 wt % in the polypropylene short fibers containing nano-titania, and the activated carbon is included in an amount of 20 wt %-30 wt % in the regenerated cellulose fibers containing activated carbon.

The preparation of polypropylene short fibers containing nano-titania and regenerated cellulose fibers containing activated carbon is carried out using conventional methods. Specifically, the nano-titania is firstly added into a spinning solution of polypropylene short fibers, and then spun and shaped, and the activated carbon particles are firstly added into a spinning solution of regenerated cellulose fibers, and then spun and shaped.

In the above-mentioned bacterial cellulose-based air filter mesh, preferably, the regenerated cellulose fibers comprise one or a combination of more of viscose fibers, bamboo viscose fibers, modal fibers and lyocell fibers.

In the above-mentioned bacterial cellulose-based air filter mesh, preferably, the process of in-situ synthesis of bacterial cellulose on a non-woven fabric through fermentation by bacteria comprises:

activating the selected cellulose-producing bacterial strains to prepare a seed liquid, and introducing the seed liquid in a fermentation medium for cultivation to prepare a fermentation stock solution;

sterilizing and immersing the non-woven fabric into the fermentation stock solution for cultivation at a temperature controlled to 20-37° C. for 12-72 h, followed by purification and drying, to produce the bacterial cellulose-based filter mesh.

The above-mentioned fermentation medium is a conventional medium used for culturing bacterial cellulose-producing strains in the art.

In the above-mentioned bacterial cellulose-based air filter mesh, preferably, the cellulose-producing bacterial strains comprise one or a combination of more of *Acetobacter xylinum, Rhizobium, Sporosarcina, Pseudomonas, Achromobacter, Alcaligenes, Aerobacter*, and *Azotobacter.*

In the above-mentioned bacterial cellulose-based air filter mesh, preferably, the purification is carried out by digesting the fermented composite with 10 wt %-20 wt % of a sodium hydroxide aqueous solution at a high temperature for 10-30 mins.

In the above-mentioned bacterial cellulose-based air filter mesh, preferably, the drying comprises freeze drying, vacuum drying or natural drying, and the sterilization includes autoclaving sterilization, irradiation sterilization or ethylene oxide sterilization.

In the above-mentioned bacterial cellulose-based air filter mesh, the method of producing bacterial cellulose on the non-woven fabric by in-situ fermentation has the following advantages: (1) Ensuring the load of titania, some of which is located inside the polypropylene fibers, and some is located on the surface of the polypropylene fibers to form a structure that has a sustained release effect to prolong the effective lifetime of titania; (2) The process of mixing and processing the polypropylene short fibers containing nano-titania and the regenerated cellulose fibers containing activated carbon into a non-woven fabric, and obtaining the bacterial cellulose by fermentation and cultivation ensures that titania and activated carbon are present on the fibers without tendency to peel off; (3) The growth of the bacterial cellulose in the holes of the non-woven fabric to form the entanglement of nano-scale cellulose fibers and micro-scale polypropylene fibers/regenerated cellulose fibers produces a composite material having high strength and multiple effects; (4) The nano-filter mesh effect of the bacterial cellulose has an adsorption effect for heavy metal ions, $NO_2$, formaldehyde, etc, while the nano-enhancing effect by entanglement with the micro-scale fibers improves the strength of the filter mesh.

In another aspect, the present invention provides use of the above-mentioned bacterial cellulose-based air filter mesh in producing gauze windows, air conditioning filters and air purification filters.

The present invention has the following beneficial effects:

(1) In the bacterial cellulose-based air filter mesh of the present invention, the bacterial cellulose is a new nano-ecological fiber-based functional material which is natural, environmentally friendly and excellent in performance. It has a good nanofiber network structure and is the thinnest as known. It has advantages of porous structure, large specific surface area and a large number of pores, and has an adsorption effect for heavy metal ions, $NO_2$, and formaldehyde, etc. The bacterial cellulose-based air filter mesh, composed of the bacterial cellulose-based filter mesh formed by in-situ synthesis of bacterial cellulose on a non-woven fabric through fermentation by bacteria and the polymer fiber filter meshes, is a multi-functional air filter mesh with anti-haze, formaldehyde removing and antibacterial properties, and can be used for gauze windows, air conditioning filters, air purification filters, etc. The bacterial cellulose-based air filter mesh of the present invention is easy to prepare, convenient to operate, and low in cost, and the bacterial cellulose-based filter mesh has good mechanical strength, ease to clean, and multiple properties, such as anti-haze, formaldehyde removing and antibacterial properties.

(2) In the bacterial cellulose-based air filter mesh of the present invention, each of the three filter mesh layers contains nano-titania. Titania is a photo-semiconductor material with a photocatalytic effect as a photocatalyst material, which means that, under the action of ultraviolet light and visible light, titania can produce strong catalytic degradation effect, and can effectively degrade toxic and harmful gases in the air, can effectively kill a variety of bacteria, and can decompose the toxins released by bacteria or fungi for a harmless treatment, while it also has the functions of removing formaldehyde, deodorizing, anti-fouling, purifying the air, etc.

(3) In the bacterial cellulose-based air filter mesh of the present invention, when the winding device is installed, the exposed parts of both ends of the bacterial cellulose-based filter mesh sandwiched between the polymer fiber filter meshes can be respectively wound on the rollers of the winding device, and a large amount of the bacterial cellulose-based filter mesh can be wound on the rollers. After the bacterial cellulose-based air filter mesh is used for a period of time, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

(4) The bacterial cellulose-based air filter mesh of the present invention can be used for producing gauze windows, air conditioning filters, air purification filters and the like, and has a wide range of applications.

(5) The bacterial cellulose-based air filter mesh of the present invention has better particle filtering effect, better formaldehyde adsorption capacity, better antibacterial performance and good electrostatic capacity.

BRIEF DESCRIPTION FOR THE DRAWINGS

The FIGURE is a schematic structural diagram of a bacterial cellulose-based air filter mesh in an embodiment of the present invention.

NUMERICAL REFERENCES 1. roller;
2. polymer fiber filter mesh;
3. bacterial cellulose-based filter mesh;
4. polymer fiber filter mesh;
5. roller.

DETAILED DESCRIPTION OF PREFERRED EMBODIMENTS

The technical solutions of the present invention are now described in detail below, so that the technical features, purposes and beneficial effects of the present invention are better interpreted, but this should not be construed as limiting the implementable scope of the present invention.

The experimental methods used in the following examples are conventional methods, unless otherwise specified.

The materials, reagents, etc. used in the following examples are commercially available, unless otherwise specified.

Example 1

This example provides a bacterial cellulose-based air filter mesh. As shown in FIG. 1, the bacterial cellulose-based air filter mesh has a three-layer structure, in which a bacterial cellulose-based filter mesh layer 3 is sandwiched by a polymer fiber filter mesh 2 and a polymer fiber filter mesh 4, wherein the polymer fiber filter mesh 2 and the polymer fiber filter mesh 4 are meshes having a uniform pore size formed from polymer fibers by blended-yarn weaving, and the bacterial cellulose-based filter mesh 3 is formed by in-situ synthesis of bacterial cellulose on a non-woven fabric through fermentation by bacteria.

In a preferred embodiment of this example, the bacterial cellulose-based air filter mesh further comprises a winding device which includes a roller 1 and a roller 5, each of which is located at both ends of the sandwiched bacterial cellulose-based filter mesh 3, for winding the bacterial cellulose-based filter mesh 3 to enable continuous replacement of the bacterial cellulose-based filter mesh 3 sandwiched between the polymer fiber filter mesh 2 and the polymer fiber filter mesh 4.

The polymer fiber filter meshes of this example is prepared by a method as follows.

The polymer fiber filter meshes of this example are composed of blended yarns obtained by spinning three kinds of short fiber materials. The three kinds of materials are polyurethane fibers (first short fibers), microporous terylene fibers (second short fibers) and polyester short fibers containing nano-titania (third short fibers), all having a length of 38 mm. The mass ratio of the first short fibers, the second short fibers and the third short fibers in the blended yarns is 4:4:2, wherein the nano-titania in the third short fibers has a content of 10 wt %, and has a crystal form of anatase type. The blended yarns are woven to form a square grid of uniform size. The thickness of the blended woven polymer fiber filter mesh is 0.5 mm, and the grid size of the polymer fiber filter mesh is 0.5 mm.

The bacterial cellulose-based filter mesh of this example is prepared by a method as follows.

(1) Preparation of bacterial cellulose liquid: *Acetobacter xylinum* is selected as the cellulose-producing bacterial strains, and activated to prepare a seed liquid which is then introduced in a fermentation medium for cultivation to prepare a fermentation stock solution.

(2) In-situ synthesis: The non-woven fabric is a composite non-woven fabric obtained by needle punching the mixture obtained by mixing polypropylene short fibers containing nano-titania and viscose fibers containing activated carbon in a mass ratio of 1:0.5. Specifically, in the polypropylene short fibers containing nano-titania, the content of the nano-titania is 10 wt %; and in the viscose fibers containing activated carbon, the content of the activated carbon is 20 wt %. After autoclaving sterilization, the non-woven fabric is immersed into the fermentation stock solution for cultivation at a temperature of at 20° C. for 72 h, and purified by digesting with 10 wt % of sodium hydroxide aqueous solution at a high temperature for 30 mins, and freeze dried, to produce the bacterial cellulose-based filter mesh.

The bacterial cellulose-based filter mesh of this example has a thickness of 5 mm. If the winding device is disposed at both ends thereof, the length thereof wound onto the roller can be 10-50 m. After the bacterial cellulose-based air filter mesh is used for 30 days, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

Example 2

This example provides a bacterial cellulose-based air filter mesh having the same structure as that of Example 1.

The polymer fiber filter meshes of this example is prepared by a method as follows.

The polymer fiber filter meshes of this example are composed of blended yarns obtained by spinning three kinds of short fiber materials. The three kinds of materials are nylon fibers (first short fibers), polyacrylonitrile fibers (second short fibers) and polyester short fibers containing nano-titania (third short fibers), all having a length of 30 mm. The mass ratio of the first short fibers, the second short fibers and the third short fibers in the blended yarns is 10:10:3, wherein the nano-titania in the third short fibers has a content of 12 wt %, and has a crystal form of rutile type. The blended yarns are woven to form a square grid of uniform size. The thickness of the blended woven polymer fiber filter mesh is 1 mm, and the grid size of the polymer fiber filter mesh is 0.5 mm.

The bacterial cellulose-based filter mesh of this example is prepared by a method as follows.

(1) Preparation of bacterial cellulose liquid: *Rhizobium* and *Sporosarcina* are selected as the cellulose-producing bacterial strains, and activated to prepare a seed liquid which is then introduced in a fermentation medium for cultivation to prepare a fermentation stock solution.

(2) In-situ synthesis: The non-woven fabric is a composite non-woven fabric obtained by needle punching the mixture obtained by mixing polypropylene short fibers containing nano-titania and bamboo viscose fibers containing activated carbon in a mass ratio of 1:1. Specifically, in the polypropylene short fibers containing nano-titania, the content of the nano-titania is 12 wt %; and in the bamboo viscose fibers containing activated carbon, the content of the activated carbon is 25 wt %. After autoclaving sterilization, the non-woven fabric is immersed into the fermentation stock solution for cultivation at a temperature of at 37° C. for 12 h, and purified by digesting with 20 wt % of sodium hydroxide aqueous solution at a high temperature for 10 min, and freeze dried, to produce the bacterial cellulose-based filter mesh.

The bacterial cellulose-based filter mesh of this example has a thickness of 2 mm. If the winding device is disposed at both ends thereof, the length thereof wound onto the roller can be 10-50 m. After the bacterial cellulose-based air filter mesh is used for 30 days, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

Example 3

This example provides a bacterial cellulose-based air filter mesh having the same structure as that of Example 1.

The polymer fiber filter meshes of this example is prepared by a method as follows.

The polymer fiber filter meshes of this example are composed of blended yarns obtained by spinning three kinds of short fiber materials. The three kinds of materials are regenerated cellulose fibers (first short fibers), microporous polycarbonate fibers (second short fibers) and polyester short fibers containing nano-titania (third short fibers), all having a length of 51 mm. The mass ratio of the first short fibers, the second short fibers and the third short fibers in the blended yarns is 5:5:2, wherein the nano-titania in the third short fibers has a content of 14 wt %, and has a crystal form of anatase type. The blended yarns are woven to form a square grid of uniform size. The thickness of the blended woven polymer fiber filter mesh is 3 mm, and the grid size of the polymer fiber filter mesh is 1 mm.

The bacterial cellulose-based filter mesh of this example is prepared by a method as follows.

(1) Preparation of bacterial cellulose liquid: *Pseudomonas* and *Achromobacter* are selected as the cellulose-producing bacterial strains, and activated to prepare a seed liquid which is then introduced in a fermentation medium for cultivation to prepare a fermentation stock solution.

(2) In-situ synthesis: The non-woven fabric is a composite non-woven fabric obtained by needle punching the mixture obtained by mixing polypropylene short fibers containing nano-titania and modal fibers containing activated carbon in a mass ratio of 1:1.5. Specifically, in the polypropylene short fibers containing nano-titania, the content of the nano-titania is 14 wt %; and in the modal fibers containing activated carbon, the content of the activated carbon is 30 wt %. After autoclaving sterilization, the non-woven fabric is immersed into the fermentation stock solution for cultivation at a temperature of at 30° C. for 36 h, and purified by digesting with 15 wt % of sodium hydroxide aqueous solution at a high temperature for 10 min, and freeze dried, to produce the bacterial cellulose-based filter mesh.

The bacterial cellulose-based filter mesh of this example has a thickness of 3 mm. If the winding device is disposed at both ends thereof, the length thereof wound onto the roller can be 10-50 m. After the bacterial cellulose-based air filter mesh is used for 30 days, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

Example 4

This example provides a bacterial cellulose-based air filter mesh having the same structure as that of Example 1.

The polymer fiber filter meshes of this example is prepared by a method as follows.

The polymer fiber filter meshes of this example are composed of blended yarns obtained by spinning three kinds of short fiber materials. The three kinds of materials are combed cotton fibers (first short fibers), polyethylene fibers (second short fibers) and polyester short fibers containing nano-titania (third short fibers), all having a length of 64 mm. The mass ratio of the first short fibers, the second short fibers and the third short fibers in the blended yarns is 1:1:1, wherein the nano-titania in the third short fibers has a content of 16 wt %, and has a crystal form of anatase type. The blended yarns are woven to form a square grid of uniform size. The thickness of the blended woven polymer fiber filter mesh is 5 mm, and the grid size of the polymer fiber filter mesh is 5 mm.

The bacterial cellulose-based filter mesh of this example is prepared by a method as follows.

(1) Preparation of bacterial cellulose liquid: *Alcaligenes, Aerobacter* and *Azotobacter* are selected as the cellulose-producing bacterial strains, and activated to prepare a seed liquid which is then introduced in a fermentation medium for cultivation to prepare a fermentation stock solution.

(2) In-situ synthesis: The non-woven fabric is a composite non-woven fabric obtained by needle punching the mixture obtained by mixing polypropylene short fibers containing nano-titania and lyocell fibers containing activated carbon in a mass ratio of 1:2. Specifically, in the polypropylene short fibers containing nano-titania, the content of the nano-titania is 16 wt %; and in the lyocell fibers containing activated carbon, the content of the activated carbon is 22 wt %. After autoclaving sterilization, the non-woven fabric is immersed into the fermentation stock solution for cultivation at a temperature of at 25° C. for 24 h, and purified by digesting with 10 wt % of sodium hydroxide aqueous solution at a high temperature for 15 min, and freeze dried, to produce the bacterial cellulose-based filter mesh.

The bacterial cellulose-based filter mesh of this example has a thickness of 4 mm. If the winding device is disposed at both ends thereof, the length thereof wound onto the roller can be 10-50 m. After the bacterial cellulose-based air filter mesh is used for 30 days, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

Example 5

This example provides a bacterial cellulose-based air filter mesh having the same structure as that of Example 1.

The polymer fiber filter meshes of this example is prepared by a method as follows.

The polymer fiber filter meshes of this example are composed of blended yarns obtained by spinning three kinds of short fiber materials. The three kinds of materials are acetate fibers (first short fibers), polypropylene fibers (second short fibers) and polyester short fibers containing nano-titania (third short fibers), all having a length of 76 mm. The mass ratio of the first short fibers, the second short fibers and the third short fibers in the blended yarns is 2:4:1, wherein the nano-titania in the third short fibers has a content of 18 wt %, and has a crystal form of anatase type. The blended yarns are woven to form a square grid of uniform size. The thickness of the blended woven polymer fiber filter mesh is 4 mm, and the grid size of the polymer fiber filter mesh is 0.5 mm.

The bacterial cellulose-based filter mesh of this example is prepared by a method as follows.

(1) Preparation of bacterial cellulose liquid: *Acetobacter xylinum* and *Achromobacter* are selected as the cellulose-producing bacterial strains, and activated to prepare a seed liquid which is then introduced in a fermentation medium for cultivation to prepare a fermentation stock solution.

(2) In-situ synthesis: The non-woven fabric is a composite non-woven fabric obtained by needle punching the mixture obtained by mixing polypropylene short fibers containing nano-titania and bamboo viscose fibers containing activated carbon in a mass ratio of 1:1. Specifically, in the polypropylene short fibers containing nano-titania, the content of the nano-titania is 18 wt %; and in the bamboo viscose fibers containing activated carbon, the content of the activated carbon is 24 wt %. After autoclaving sterilization, the non-woven fabric is immersed into the fermentation stock solution for cultivation at a temperature of at 30° C. for 36 h, and purified by digesting with 10 wt % of sodium hydroxide aqueous solution at a high temperature for 30 min, and freeze dried, to produce the bacterial cellulose-based filter mesh.

The bacterial cellulose-based filter mesh of this example has a thickness of 1 mm. If the winding device is disposed at both ends thereof, the length thereof wound onto the roller can be 10-50 m. After the bacterial cellulose-based air filter mesh is used for 30 days, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

Example 6

This example provides a bacterial cellulose-based air filter mesh having the same structure as that of Example 1.

The polymer fiber filter meshes of this example is prepared by a method as follows.

The polymer fiber filter meshes of this example are composed of blended yarns obtained by spinning three kinds of short fiber materials. The three kinds of materials are polyurethane fibers (first short fibers), microporous terylene fibers and polytetrafluoroethylene fibers (second short fibers, wherein the mass ratio of the microporous terylene fibers and the polytetrafluoroethylene fibers is 10:1) and polyester short fibers containing nano-titania (third short fibers), all having a length of 150 mm. The mass ratio of the first short fibers, the second short fibers and the third short fibers in the blended yarns is 1:2:1, wherein the nano-titania in the third short fibers has a content of 20 wt %, and has a crystal form of rutile type. The blended yarns are woven to form a square grid of uniform size. The thickness of the blended woven polymer fiber filter mesh is 0.5 mm, and the grid size of the polymer fiber filter mesh is 5 mm.

The bacterial cellulose-based filter mesh of this example is prepared by a method as follows.

(1) Preparation of bacterial cellulose liquid: *Acetobacter xylinum* and *Achromobacter* are selected as the cellulose-producing bacterial strains, and activated to prepare a seed liquid which is then introduced in a fermentation medium for cultivation to prepare a fermentation stock solution.

(2) In-situ synthesis: The non-woven fabric is a composite non-woven fabric obtained by needle punching the mixture obtained by mixing polypropylene short fibers containing nano-titania and modal fibers containing activated carbon in a mass ratio of 1:1. Specifically, in the polypropylene short fibers containing nano-titania, the content of the nano-titania is 20 wt %; and in the modal fibers containing activated carbon, the content of the activated carbon is 26 wt %. After autoclaving sterilization, the non-woven fabric is immersed into the fermentation stock solution for cultivation at a temperature of at 35° C. for 72 h, and purified by digesting with 20 wt % of sodium hydroxide aqueous solution at a high temperature for 30 min, and freeze dried, to produce the bacterial cellulose-based filter mesh.

The bacterial cellulose-based filter mesh of this example has a thickness of 3 mm. If the winding device is disposed at both ends thereof, the length thereof wound onto the roller can be 10-50 m. After the bacterial cellulose-based air filter mesh is used for 30 days, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

Example 7

This example provides a bacterial cellulose-based air filter mesh having the same structure as that of Example 1.

The polymer fiber filter meshes of this example is prepared by a method as follows.

The polymer fiber filter meshes of this example are composed of blended yarns obtained by spinning three kinds of short fiber materials. The three kinds of materials are combed cotton fibers and combed cotton fibers (first short fibers, wherein the mass ratio of the regenerated cellulose fibers and the combed cotton fibers is 5:5), microporous terylene fibers (second short fibers) and polyester short fibers containing nano-titania (third short fibers), all having a length of 38 mm. The mass ratio of the first short fibers, the second short fibers and the third short fibers in the blended yarns is 10:10:7, wherein the nano-titania in the third short fibers has a content of 12 wt %, and has a crystal form of rutile type. The blended yarns are woven to form a square grid of uniform size. The thickness of the blended woven polymer fiber filter mesh is 2 mm, and the grid size of the polymer fiber filter mesh is 2 mm.

The bacterial cellulose-based filter mesh of this example is prepared by a method as follows.

(1) Preparation of bacterial cellulose liquid: *Acetobacter xylinum* and *Pseudomonas* are selected as the cellulose-producing bacterial strains, and activated to prepare a seed liquid which is then introduced in a fermentation medium for cultivation to prepare a fermentation stock solution.

(2) In-situ synthesis: The non-woven fabric is a composite non-woven fabric obtained by needle punching the mixture obtained by mixing polypropylene short fibers containing nano-titania and modal fibers containing activated carbon in a mass ratio of 1:0.5. Specifically, in the polypropylene short fibers containing nano-titania, the content of the nano-titania is 10 wt %; and in the modal fibers containing activated carbon, the content of the activated carbon is 28 wt %. After autoclaving sterilization, the non-woven fabric is immersed into the fermentation stock solution for cultivation at a temperature of at 37° C. for 72 h, and purified by digesting with 20 wt % of sodium hydroxide aqueous solution at a high temperature for 30 min, and freeze dried, to produce the bacterial cellulose-based filter mesh.

The bacterial cellulose-based filter mesh of this example has a thickness of 5 mm. If the winding device is disposed at both ends thereof, the length thereof wound onto the roller can be 10-50 m. After the bacterial cellulose-based air filter mesh is used for 30 days, the bacterial cellulose-based filter mesh in the middle layer can be wound to one end by rotating the winding devices at both ends, so as to replace the used bacterial cellulose-based filter mesh in the middle layer, thereby extending the service life of the whole air filter mesh.

Tests on the Performances:

(1) Test on Filtration Efficiency and Formaldehyde Removal:

The bacterial cellulose-based air filter mesh produced in Example 1 was tested for filtration efficiency and formaldehyde removal. The results are shown in Table 1 below:

TABLE 1

| Sample | Strength, TD | Strength, MD | Formaldehyde adsorption capacity (mg/g) | Filtration efficiency, 0.3-10 μm |
|---|---|---|---|---|
| The bacterial cellulose-based filter mesh in Example 1 | 1200N | 1100N | 5.58 | 94% |
| The composite non-woven fabric in Example 1 | 1000N | 900N | 5.06 | 92% |
| The whole bacterial cellulose-based air filter mesh in Example 1 | 1250N | 1150N | 6.00 | 94% |

It can be seen from the results in Table 1 that, the bacterial cellulose-based air filter mesh having the three-layer structure has a filtration efficiency for 0.3-10 μm particles of ≥94%, a pressure drop of 20 Pa, a strength of TD ≥1250N or MD ≥1150N, and a formaldehyde adsorption capacity of ≥6 mg/g.

(2) Test on Antibacterial Performance:

The whole bacterial cellulose-based air filter mesh in Example 1 was tested for the antibacterial performance in accordance with GB/T 20944.3-2008 "Textiles—Evaluation for antibacterial activity—Part 3: Oscillation method". The results showed an antibacterial rate against *Escherichia coli* and *Staphylococcus aureus* of 99% or more.

(3) Electrostatic Test:

The electrostatic test showed the following results: the bacterial cellulose-based air filter mesh had a frictional potential of 12 kV, a frictional charge density of 16 μC/m², and a half-life of 92 s. It had good electrostatic capacity, and the charge was not prone to dissipate. After 200 washes, there is no significant change in the data.

The invention claimed is:

1. A bacterial cellulose-based air filter mesh, comprising a three-layer structure, in which a layer of a bacterial cellulose-based filter mesh is sandwiched by two layers of polymer fiber filter mesh;

wherein each of the two layers of polymer fiber filter mesh has a uniform mesh grid of polymer fibers produced by blended-yarn weaving; and the bacterial cellulose-based filter mesh is made by synthesizing bacterial cellulose on a non-woven fabric through fermentation by bacteria;

the bacterial cellulose-based air filter mesh further comprising a winding device including two rollers, which are respectively located at both ends of the sandwiched bacterial cellulose-based filter mesh, for winding the bacterial cellulose-based filter mesh, to enable continuous replacement of the bacterial cellulose-based filter mesh sandwiched between the two layers of the polymer fiber filter mesh.

2. The bacterial cellulose-based air filter mesh according to claim 1, wherein each of the two layers of polymer fiber filter mesh is 0.5-5 mm thick and each side length of the grid is 0.5-5 mm, and the bacterial cellulose-based filter mesh has a thickness of 1-5 mm.

3. The bacterial cellulose-based air filter mesh according to claim 1, wherein each of the two layers of the polymer fiber filter mesh is formed from first short fibers, second short fibers and third short fibers in a mass ratio of 1:(1-2):(0.3-1) by blended-yarn weaving;

wherein the first short fibers comprise short fibers of polyurethane fibers, nylon fibers, regenerated cellulose fibers, combed cotton fibers, acetate fibers or combination thereof;

the second short fibers comprise short fibers of microporous terylene fibers, polyacrylonitrile fibers, microporous polycarbonate fibers, polyethylene fibers, polypropylene fibers, polytetrafluoroethylene fibers or combination thereof; and the third short fibers comprise polyester short fibers containing nano-titania.

4. The bacterial cellulose-based air filter mesh according to claim 3, wherein the first short fibers, the second short fibers and the third short fibers are present in a mass ratio of 1:1:0.5.

5. The bacterial cellulose-based air filter mesh according to claim 3, wherein the nano-titania is included in an amount of 10 wt %-20 wt % in the third short fibers.

6. The bacterial cellulose-based air filter mesh according to claim 5, wherein the nano-titania has a crystal form of rutile type or anatase type.

7. The bacterial cellulose-based air filter mesh according to claim 1, wherein the non-woven fabric is a composite non-woven fabric obtained by spunlace or needle punching a mixture of polypropylene short fibers containing nano-titania and regenerated cellulose fibers containing activated carbon in a mass ratio of 1:(0.5-2).

8. The bacterial cellulose-based air filter mesh according to claim 7, wherein the nano-titania is included in an amount of 10 wt %-20 wt % in the polypropylene short fibers containing nano-titania, and the activated carbon is included in an amount of 20 wt %-30 wt % in the regenerated cellulose fibers containing activated carbon.

9. The bacterial cellulose-based air filter mesh according to claim 7, wherein the regenerated cellulose fibers comprise viscose fibers, bamboo viscose fibers, modal fibers, lyocell fibers or combination thereof.

10. The bacterial cellulose-based air filter mesh according to claim 1, wherein the process of synthesizing bacterial cellulose on a non-woven fabric through fermentation by bacteria comprises:

activating cellulose-producing bacteria to prepare a seed liquid, and introducing the seed liquid in a fermentation medium for cultivation to prepare a fermentation stock solution;

sterilizing and immersing the non-woven fabric into the fermentation stock solution, for cultivation at a temperature controlled to 20-37° C. for 12-72 h, followed by purification and drying, to produce the bacterial cellulose-based filter mesh.

11. The bacterial cellulose-based air filter mesh according to claim 7, wherein the process of synthesizing bacterial cellulose on a non-woven fabric through fermentation by bacteria comprises:

activating cellulose-producing bacteria to prepare a seed liquid, and introducing the seed liquid in a fermentation medium for cultivation to prepare a fermentation stock solution;

sterilizing and immersing the non-woven fabric into the fermentation stock solution, for cultivation at a temperature controlled to 20-37° C. for 12-72 h, followed by purification and drying, to produce the bacterial cellulose-based filter mesh.

12. The bacterial cellulose-based air filter mesh according to claim 10, wherein the cellulose-producing bacteria is

*Acetobacter xylinum, Rhizobium, Sporosarcina, Pseudomonas, Achromobacter, Alcaligenes, Aerobacter, Azotobacter* or combination thereof.

13. The bacterial cellulose-based air filter mesh according to claim 11, wherein the cellulose-producing bacteria is *Acetobacter xylinum, Rhizobium, Sporosarcina, Pseudomonas, Achromobacter, Alcaligenes, Aerobacter, Azotobacter* or combination thereof.

14. The bacterial cellulose-based air filter mesh according to claim 10, wherein the drying comprises freeze drying, vacuum drying or natural drying; and the sterilization includes autoclaving sterilization, irradiation sterilization or ethylene oxide sterilization.

15. The bacterial cellulose-based air filter mesh according to claim 11, wherein the drying comprises freeze drying, vacuum drying or natural drying; and the sterilization includes autoclaving sterilization, irradiation sterilization or ethylene oxide sterilization.

\*    \*    \*    \*    \*